United States Patent [19]

Nomura et al.

[11] Patent Number: 4,910,097
[45] Date of Patent: Mar. 20, 1990

[54] ZINC ALLOY-PLATED CORROSION PREVENTIVE STEEL SHEET HAVING AN ORGANIC COATING LAYER THEREON AND A METHOD FOR MAKING THE SAME

[75] Inventors: Shingo Nomura, Akashi; Hirohiko Sakai; Kanji Nakamura, both of Kakogawa; Etuo Yamamoto, Itami, all of Japan

[73] Assignee: Kabushiki Kaisha Kobe Seiko Sho, Kobe, Japan

[21] Appl. No.: 284,554

[22] Filed: Dec. 15, 1988

[51] Int. Cl.$^4$ ............................................. B32B 15/04
[52] U.S. Cl. ................................. 428/623; 427/388.4; 428/626; 428/632; 428/659
[58] Field of Search ............... 428/623, 626, 632, 659; 427/388.4

[56] References Cited

U.S. PATENT DOCUMENTS

| | | | |
|---|---|---|---|
| 4,304,822 | 12/1981 | Heyl | 428/623 |
| 4,389,463 | 6/1983 | Smeggil et al. | 420/514 |
| 4,407,899 | 10/1983 | Hara et al. | 428/659 |
| 4,705,726 | 11/1987 | Shindou et al. | 428/659 |
| 4,775,600 | 10/1988 | Adaniya et al. | 428/623 |

Primary Examiner—Robert McDowell
Attorney, Agent, or Firm—Oblon, Spivak, McClelland, Maier & Neustadt

[57] ABSTRACT

A corrosion preventive steel sheet having an organic coating layer is described. The steel sheet is comprised of a zinc alloy-plated steel sheet, and a chromate layer and an organic coating layer formed in this order on at least one side of the steel sheet. The organic coating layer is formed from a coating composition comprised of 100 parts by weight of a water-soluble urethane resin and from 5 to 80 parts by weight of colloidal silica. A method for making the corrosion preventive steel sheet is also described.

19 Claims, 2 Drawing Sheets

ZINC ALLOY-PLATED CORROSION PREVENTIVE STEEL SHEET HAVING AN ORGANIC COATING LAYER THEREON AND A METHOD FOR MAKING THE SAME

BACKGROUND OF THE INVENTION

1. Field of the Invention

This invention relates to zinc alloy-plated corrosion preventive steel sheets having an organic coating thereon. The organic coated steel sheets have a good corrosion resistance and a good adhesion under forming conditions and thus, have wide utility in various fields of electro painting, second coating and top coating of automobile bodies and home appliances. The invention also relates to a method for making the corrosion preventive steel plates of the type mentioned above.

2. Description of the Prior Art

In the industries of automobiles and home appliances, there has recently been a strong demand for corrosion preventive steel sheets have been recently. Accordingly, hitherto employed coldrolled steel sheets and plated steel sheets tend to be replaced by surface-treated steel sheets having a better corrosion resistance. The surface-treated steel sheets used, for example, as bodies for automobiles are a corrosion preventive steel sheet generally called "zinchro metal". This includes, on a steel sheet, a first layer containing a chromium compound and a second layer of a zinc-rich paint comprising zinc powder and a resin and is hereinafter called zinc-rich corrosion preventive steel sheet. The zinc-rich corrosion preventive steel sheet has a good corrosion resistance and is capable of satisfactorily undergoing electro deposition painting and spot welding which are essentially required for use a steel sheet for automobiles.

However, the zinc-rich corrision preventive steel sheet has the following problems.

(1) In order to ensure satifactory corrosion resistance and electro deposition properties, the zinc powder should be contained in the second layer in amounts not less than 80 wt%, with the great possibility of causing the film to separate as fine powder when the steel sheet is pressed thereby forming defects in the sheet.

(2) In case where the zinc-rich film is painted in a thickness as great as, for example, 10 micrometers or over, the zinc powder and the resin present in large amounts are left as a combustion residue when the steel sheet is subjected to continuous spot welding. This entails contamination of electrode chips with the residue with an increasing frequency of chip dressing, thus resulting in poor workability.

In order to solve the problems involved in the zinc-rich corrosion preventive steel sheet, there have been proposed improved corrosion preventive steel sheets, for example, in Japanese Laid-open Patent Application Nos. 57-108292 and 58-98172. The corrosion preventive steel sheets proposed in these Laid-open Applications have, on the surface thereof, composite organosilicate resin films comprised mainly of resins having a hydroxyl group or groups in the molecule, such as polyvinyl alcohol, acrylic resins, epoxy resins, polyesters and the like, to which silica sol and silane compounds are added, or resin films of the above composite organosilicate resins to which oxyacids of Mo, W, V, Sn, B and the like and salts hereof are added. However, these corrosion preventive steel sheets are still unsatisfactory in the corrosion resistance and involves a problem with respect to film adhesion weldability, cratering resistance and paint finish at the time of forming when applied as a steel sheet for automobiles.

SUMMARY OF THE INVENTION

It is accordingly an object of the invention to provide a zinc alloy-plated corrosion preventive steel sheet having an organic coating layer on at least one side of the steel sheet which overcomes the disadvantages involved in he prior art corrosion preventive steel sheets and which has a corrosion resistance.

It is another object of the invention to provide a zinc alloy-plate corrosion preventive steel sheet having an organic coating having good adhesion to the steel sheet whereby breakage of the coating into pieces can be appropriately avoided under forming conditions.

It is a further object of the invention to provide an organic coated corrosion preventive steel sheet which has not only the good corrosion resistance and the good coating adhesion to the steel sheet, but also good properties such as a cratering resistance, paint adhesion, paint finish and spot weldability.

It is a still further object of the invention to provide a method for making the organic coated corrosion preventive steel sheet of the type mentioned above.

In accordance with one embodiment of the invention, there is provided a corrosion preventive steel sheet which comprises a zinc alloy-plated steel sheet, and a chromate layer and an organic coating layer both formed on at least one side of the steel sheet. The organic coating layer is formed from a coating composition comprised of 100 parts by weight of a water-soluble urethane resin and from 5 to 80 parts by weight of colloidal silica. The organic coating layer is usually formed by coating an aqueous dispersion of the coating composition on the at least one side of the steel sheet and baked.

In accordance with another embodiment of the invention, there is also provided a method for making a corrosion preventive steel sheet which comprises: providing a zinc alloy-plated steel sheet having a chromate layer on at least one side thereof: applying onto the chromate layer of the steel sheet a coating composition comprised of 100 parts by weight of a water-soluble urethane resin and from 5 to 80 parts by weight of colloidal silica in a liquid medium; and baking the applied composition to form a resin layer fixed on the chromate layer. If an isocyanate crosslinking agent is contained in the resin layer, the baking should be effected at an ultimate temperature of from 90° to 200° C. for a time of from 15 to 120 seconds for the reasons described hereinafter.

DETAILED DESCRIPTION OF THE INVENTION

Figure 1:
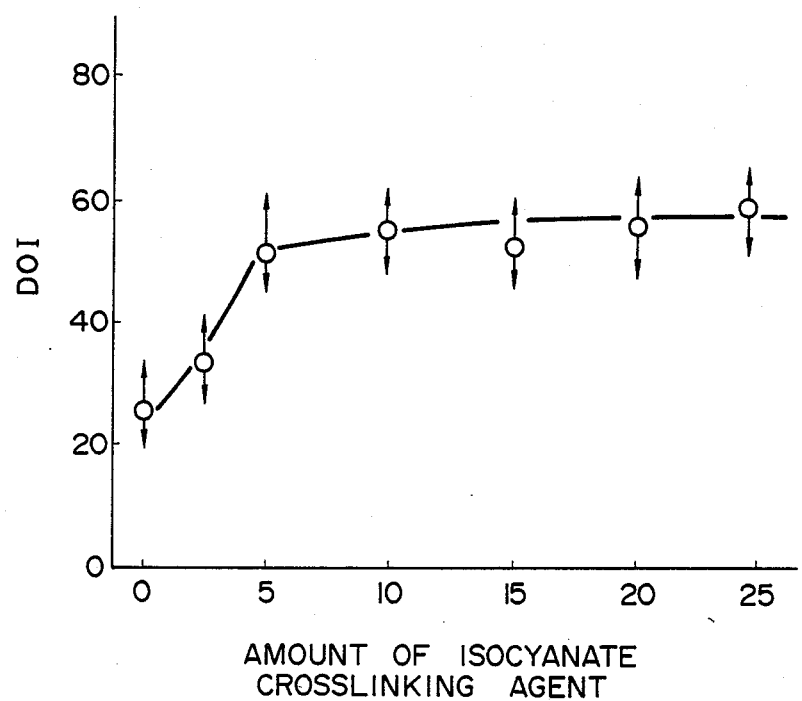
FIG. 1 is a graph showing the relationship between the amount of an isocyanate crosslinking agent and the sharpness (DOI)

The zinc alloy-plated corrosion preventive steel plate according to the invention should have a base steel sheet plated with a zinc alloy, a chromate layer and a coating layer of an organic resin composition formed on the steel sheet in this order. The zinc alloy-plated steel sheet, the chromate layer and the organic coating layer are described in detail.

The base steel sheet plated with an zinc alloy useful in the present invention may be any known zinc alloy-plated steel sheets including, for example, zinc-iron alloy-plated steel sheets, zinc-nickel alloy-plated steel sheets, zinc-aluminium alloy-plated steel sheets, zinc-cobalt-chromium alloy-plated steel sheets and the like with or without further addition of at least one element such as Ni, Fe, Mn, Co, Al, Co and the like. The plated alloy layer may be a single layer or a composite layer including two or more sub-layers. Of these, Zn-Ni alloys and Zn-Fe alloys are preferred in the practice of the invention. Further, the Zn-Fe alloy is preferably plated by heating a Zn-plated steel sheet to form an Zn-Fe alloy layer. The plated Zn-Fe alloy should preferably have an Fe content of from 6 to 20 wt%.

The Zn alloy-plated steel sheet should have a chromate layer on at least one side of the steel sheet. The chromate layer is preferably formed in an amount of 1 to 500 mg/m$^2$, more preferably from 10 to 300 mg/m$^2$ calculated as chromium. If the amount of the chromium is less than 1 mg/m$^2$, the chromate layer becomes non-uniform. Over 500 mg/m$^2$, the steel sheet tends to become poor in formability and weldability. Preferability, the chromate layer should contain hexavalent chromium since the hexavalent chromium has the restoring action. If the steel sheet is marred or undergoes defects, the hexavalent chromium is able to suppress spreading of corrosion from the defects. The chromate layer may be formed by any known procedures including a reaction procedure, coating and electrolytic procedures.

In the practice of the invention, the organic layer is formed on at least one side of the steel sheet which has such a chromate layer as mentioned above. The organic layer is formed from a composition which comprises 100 parts by weight of a water-soluble urethane resin and from 5 to 80 parts by weight of colloidal silica. If necessary, the composition may further comprise from 1 to 40 parts by weight of a silane coupling agent, from 50 to 600 parts by weight of zinc powder, from 1 to 20 parts by weight of a silicone or fluorine-containing water repellent, and from 5 to 20 parts by weight of a water-soluble isocyanate crosslinking agent.

The water-soluble urethane resin is actually used in the form of an aqueous emulsion. The preferred urethane resins are polyurethane resins or urethane prepolymers which are introduced with hydrophilic groups upon polymerization reaction of various organic polyisocyanates and polyhydric hydroxy compounds. The organic polyisocynates include aliphatic, aromatic alicyclic isocyanates such as tolylene diisocyanate, diphenylmethane diisocyanate, polymethylene polyphenyl isocyanate, hexamethylene diisocyanate, xylylene diisocyanate, naphthalene diisocyanate, t olidine diisocyanate, isphorone diisocyanate, hydrogenated xylylene diisocyanate, hydrogenated dicyclohexylmethane diisocyanate and the like, and dimers trimers thereof. Examples of the polyhydric hydroxy compounds include polyether polyols such as polyalkylene glysocls, polyamine polyols, polymer polyols, polytetramethylene glycol and the like, polyester polyols such as adipate polyols, phthalate polyols, polycaprolactone polyols, polycarbonate polyols and the like, and polyhydric alcohols such as trimethylol propane, butanediol and the like. These resins or prepolymers can be readily emulsified into water. For emulsification, the polyurethane or urethane prepolymers obtained by polymerization reaction of organic polyisocyanates and polyhydric hydroxy compounds may be forced to be emulsified by the use of suitable surface active agents or colloidizing agents.

The resin used to form the organic coating layer is made of a polyurethane or a urethane prepolymer as described above. Other resins may be added to the coating composition provided that the polyurethane or urethane prepolymer is used as a main ingredient. More particularly, epoxy, acrylic and/or phenolic resins may be added in amounts not larger than 50 parts by weight per 100 parts by weight of the urethane resin. Since the water-soluble urethane resin is used as a main ingredient of the organic coating layer, the corrosion resistance and film adhesion under forming condition can be remarkably improved over those attained by steel sheets coated with other resins. In addition, the cratering resistance, coating adhesion, paint finishing property and spot weldability are also improved.

The colloidal silica is used in an amount of from 5 to 80 parts by weight, preferably from 40 to 70 parts by weight, per 100 parts by weight of the urethane resin. Less amounts are unfavorable because the corrosion resistance is not significantly improved by the addition of the colloidal silica. Over 80 parts by weight, the resin film becomes poor in formability, e.g. when the organic coated steel sheet is formed, the coated layer is apt to separate.

In the practice of the invention, the organic coating layer may further comprise additives such as silane coupling agent, zinc powder, a silicon or fluorine-containing water repellent and a water-soluble isocyanate crosslinking agent. These additives are described.

The zinc powder is generally added in an amount of from 50 to 600 parts by weight per 100 parts by weight of the urethane resin. If the amount is less than 50 parts by weight, an improvement in spot weldability cannot be expected. On the other hand, when the amount exceeds 600 parts by weight, the effect of the resin as a binder is reduced and the resultant film tends toward cohesive failure, thus leading to poor formability.

The silane coupling agent serves to fix the colloidal silica in the resin layer and can thus improve the corrosion resistance. The amount of the silane coupling agent is in the range of from 1 to 40 parts by weight, preferably from 5 to 20 parts by weight, per 100 parts by weight of the resin. If the amount is less than 1 part by weight, fair effects of fixing the colloidal silica and improving the corrosion resistance are not recognized. When the amount is increased over 40 parts by weight, the effect on the corrosion resistance is saturated and the viscosity of the coating composition increases, resulting in poor formability.

Moreover, a silicon or fluorine-containing water repellent and an isocyanate crosslinking agent may be added. The silicon or fluorine-containing water repellent is added in an amount of from 1 to 20 parts by weight per 100 parts by weight of the resin. If the amount is less than 1 part by weight, a paint finish is not improved significantly. Over 20 parts by weight, adhesion of the resulting film to an electro painting film lowers. The silicon or fluorine-containing water repellent may be any water repellent of the emulsion type having siloxane bonds irrespective of the ionic nature. In order to improve the paint finishing property, this water repellent has to be used in combination with the isocyanate crosslinking agent. This effect is not recognized when using these ingredients singly.

The isocyanate crosslinking agent is used in an amount of from 5 to 20 parts by weight per 100 parts by weight of the resin. Below 5 parts by weight, the finishing effect is not significantly recognized, whereas over 20 parts by weight, the effect is not further improved with poor economy.

The isocyanate crosslinking agents may be any water-soluble aliphatic polyisocyanates which are able to release the isocyanate groups when the organic layer is treated or baked, especially when electro painting is effected, under conditions of not lower than 160° C. and not shorter than 3 minutes. One typical and preferred isocyanate is a compound of the following general formula

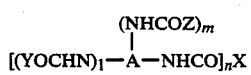

wherein n is an integer of from 2 to 4, 1+m is an integer of from 2 to 4, A represents a polyisocyanate residue having from 3 to 5 functional groups, Y represents a residue of a blocking agent capable of releasing an isocyanate group by thermal treatment, Z represents a residue of a compound having at least one active hydrogen atom and at least one anion-forming group in one molecule, and X represents a residue of a compound having from 2 to 4 active hydrogen atoms and average molecular weight of not larger than 5000.

The reason why the water repellent and the crosslinking agent have such a function of improving paint finishing properties is not clearly known as yet but is considered as follows.

When the organic composition is applied, the silicon or fluorine-containing water repellent is present in the surface of the layer of the composition as concentrated with a great surface tension being imparted to the resin layer. When electro painting is effected on the organic film, it is considered that thermal flow properties of a paint for electro deposition increases at the time of baking because of the great surface tension on the film surface.

On the other hand, since an isocyanate crosslinking agent is also present in a paint for electro deposition as well. When heat is applied under conditions of 160° C.×3 minutes or greater, a blocking agent or group is released, whereupon polymerization or crosslinking starts to take place. It is assumed that in this condition, the isocyanate crosslinking agent in the organic resin layer reacts with the paint for electro deposition thereby increasing miscibility between the organic resin layer and the electro deposition layer. The synergistic effect of the water repellent and the crosslinking agent is considered to remarkably improve the finishing properties after the electro painting.

Figure 2:
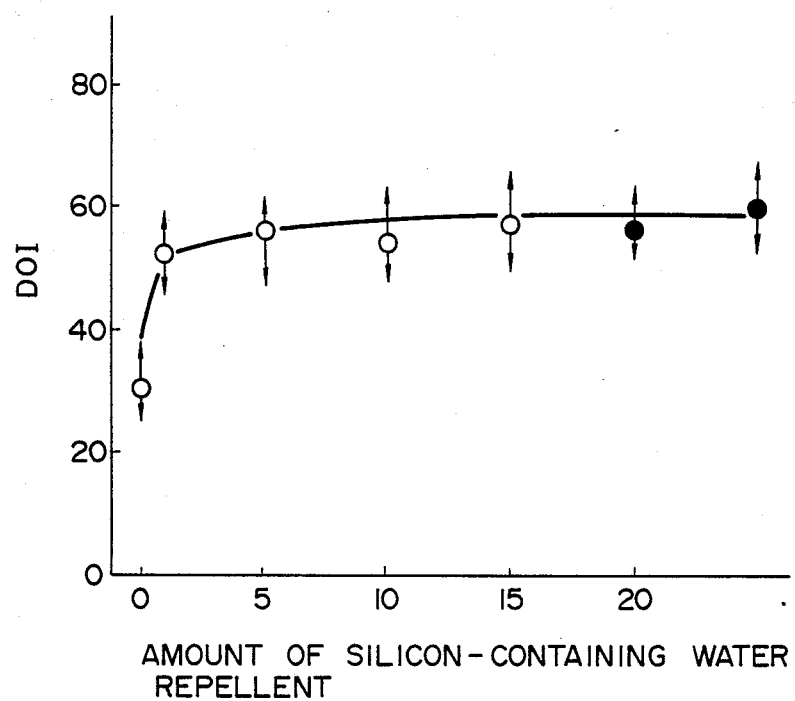
FIG. 2 is a graph showing the relationship between the amount of a silicon-containing water repellent and the sharpness.

FIGS. 1 and 2, respectively, show the sharpness of a coating after the electro painting in relation to the variation in content of an isocyanate crosslinking agent and a silicon water repellent.

For the measurement of the sharpness, a DOI meter is used. A steel sheet on which a resin composition has been coated is further applied with a cation paint for electro deposition (PT-U, available from Nippon Paint Co., Ltd.) in a dry thickness of 20 micrometers. Subsequently, a 0.25 mm thick polyethylene pressure-sensitive adhesive film is attached on the paint layer and the sharpness is measured. With regard to FIG. 1, 100 parts by weight of a water-soluble urethane resin, 50 parts by weight of SiO$_2$, 3 parts by weight of a silicon-containing water repellent, 7 parts by weight of a silane coupling agent and 200 parts by weight of pure water are used, to which an isocyanate crosslinking agent (Millionate MS-50 emulsion, product of Nippon Polyurethane Co., Ltd.) is added in different amounts.

In FIG. 2, a silicon-containing water repellent (SE1980, product of Toray Silicon Co., Ltd.) is added in different amounts to a composition comprised of 100 parts by weight of a water-soluble urethane resin, 50 parts by weight of SiO$_2$, 12 parts by weight of an isocyanate crosslinking agent, 15 parts by weight of a silane coupling and 200 parts by weight of pure water.

As will be apparent from FIGS. 1 and 2, the sharpness is good when the water repellent is used in an amount of from 1 to 20 parts by weight per 100 parts by weight of the water-soluble resin and when the isocyanate crosslinking agent is used in an amount of from 5 to 20 parts by weight per 100 parts by weight of the water-soluble resin. In FIG. 2, the solid circle "•" indicates a lowering of the film adhesion.

The organic resin composition may further comprise from 10 to 200 parts by weight of nonmetallic powders per 100 parts by weight of the water-soluble resin. By the addition of the nonmetallic powders in the defined amount, the resin composition layer is improved not only corrosion resistance, but also spot weldability and formability. In general, the spot weldability of the corrosion preventive steel sheet is greatly influenced by the resin composition layer. For imparting electric conductivity to the urethane resin composition layer necessary for spot welding, it is necessary to make a small layer thickness or incorporate a metal powder in the layer. In either case, the corrosion resistance is sacrificed to an extent.

When a nonmetallic powder having preferably a size of from 0.1 to 5 micrometers is uniformly dispersed in the resin composition layer, the layer is pressed between chips at the time of spot welding whereupon cracks and thinner portions are produced at the interfaces of the resin. This permits the applied current to be more readily passed through the layer, leading to improved spot weldability.

As described above, the nonmetallic powder in the layer influences not only corrosion resistance, but also spot weldability and formability. In order to completely satisfy requirements for these characteristic properties, the amount of the nonmetallic powder should be within a range of from 10 to 200 parts by weight per 100 parts by weight of the water-soluble resin. If the amount is less than 10 parts by weight, the effect on the spot weldability lowers to a degree. Over 200 parts by weight, the resin composition layer tends to separate from the steel sheet when pressed and the corrosion resistance may deteriorate.

The nonmetallic metal powder should preferably have a size of from 0.1 to 5 micrometers. This is because when the size is smaller than 0.1 micrometer, the resultant layer is apt to be non-uniform, giving influences on spot weldability. The size over 5 micrometers is not so favorable in view of the thickness of the resin composition layer. Examples of the nonmetallic powders include those powders of silicon dioxide, aluminium oxide, zirconium oxide, boron nitride, magnesium phosphate, strontium chromate, silicon carbide and the like. Of these, silicon dioxide powder is preferred. These powders may be used singly or in combination. The urethane resin composition layer containing the nonmetallic powder is preferably deposited in an amount of from 0.5 to 5.0 g/m². Less amounts may be unsatisfactory with respect to the improvement in corrosion resistance. Over 5 g/m², the spot weldability may not be improved as desired.

The method for making the corrosion preventive steel sheet of the type described hereinabove is described.

The zinc alloy-plated steel sheet having a chromate layer is first provided. The steel sheet may be one which is obtained by any known techniques. This type of steel sheet is well known in the art and is not particularly described herein.

The resin composition as described before is applied on at least one side, preferably on opposite sides, of the steel sheet by known coating techniques. Although not critical, the composition is applied so that the thickness of the resultant composition layer afer baking is within a range of from 0.3 to 5 micrometers. Subsequently, the applied layer is baked. If an isocyanate crosslinking agent which has the capability of releasing its blocking groups at 160° C. or higher for 3 minutes or longer is contained in the composition, the baking should be effected at an ultimate temperature of from 90° C. to 200° C. within a time of from 15 to 120 seconds. In this case, higher temperatures within the above range should combine with shorter times within the range defined above. If, however, the baking temperature is lower than 90° C., the resin composition layer is left sticky. Over 200° C., the blocking groups or agents of the isocyanate crosslinking agent are split off, completing crosslinking in the layer. Accordingly, the isocyanate crosslinking agent does not properly act at the time of baking during the electro deposition, thus not contributing to a good painting finish.

The present invention is more particularly described by way of examples. Comparative examples are also shown. In the examples and comparative examples, parts are by weight. The following tests were conducted in the examples and comparative examples.

(1) Paint finishing property (sharpness) test

An electro deposition paint used was PT-U100 available from Nippon Paint Co., Ltd. This paint was subjected to electro painting so that a thickness after baking was 20±1 micrometers, and baked under conditions of 165° C.×20 minutes. Thereafter, a 0.25 mm thick polyethylene pressure-sensitive tape was attached on the paint layer and subjected to measurement of the sharpness by means of a DOI meter.

(2) Film adhesion test

Similar to (1) above, PT-U100 was used and electropainted in a thickness, after baking, of 20±1 micrometers under conditions of 165° C.×20 minutes and subjected to a 1 mm square cross cut tape test. The results are expressed as the number of remaining cross cut films per the total number.

(3) Cratering test

Similar to (1) above, PT-U100 was used and electropainted, after which a crater formation voltage of the resultant film was determined.

The electro painting conditions used are as follows.
Area of anode: area of cathode=1:1,
Distance between the electrodes: 100 mm,
30 sec. rise-up control: 2.5 minutes,
Voltage: changed every 20 volts from 180 to 340 volts,
Bath temperature: 29±1° C.

(4) Corrosion resistance test

Zinc alloy-plated corrosion preventive steel sheets having an organic resin composition layer and obtained in the respective examples and comparative examples were each subjected to cross cutting with a cutter knife and subsequently to the following corrosion cycle test repeated by 200 cycles.
Repeated in the following order of salt spray test
(35° C. ×4 hours) - drying (60° C.×2 hours) - wetting,
(50° C.×2 hours) - salt spray test,
One cycle was completed in 8 hours.

(5) Spot weldability test

Continuous spot welding was effected under the following conditions.
Welding pressure: 200 kg,
Welding time: 12 cycles (60 Hz),
Electrode chips: dome chip with a tip diameter of 6 mm,
Current: an intermediate current value within an optimum range for the respective samples (formation of nugget - pick up).

The assessment was made by the number of the welding cycles before the diameter of the nugget reached a value of $4.5\sqrt{t}$.

(6) Film adhesion test under forming conditions

Figure 3:
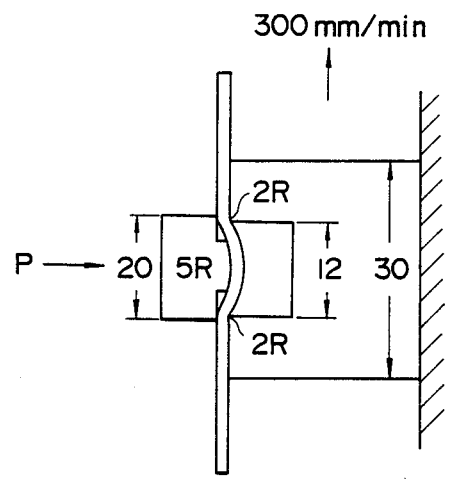
FIG. 3 is a illustrative view of a draw bead tester.

A draw bead tester shown in FIG. 3 was used to determine a separated amount of the organic resin film of each sample. The pulling speed was 300 mm/minute and the elongation was 15%.

EXAMPLE 1

| Water-soluble urethane resin | 100 parts |
| Colloidal silica (SiO₂ 40%) | 50 parts |
| Pure water | 240 parts |

The above ingredients were mixed. A Zn-12% Ni-plated steel sheet having an amount of plating of 20 g/m² was degreased and subjected to chromate treatment (Cr: 50 mg/m²) by application with an anhydrous chromic acid aqueous solution and dried at a temperature of 120° C. Thereafter, the mixture was applied onto the steel sheet by the use of a laboratory roll coater and subsequently baked at a maximum steel sheet temperature of 200° C. for 60 seconds to obtain a corrosion preventive steel sheet having a resin composition layer with an average thickness of 1.5 micrometers.

EXAMPLES 2 to 11

The general procedure of Example 1 was repeated except that plated steel sheets, coating compositions, chromate treatment and baking conditions indicated in Table 1 were used, thereby obtaining a resin composition-coated steel sheets.

TABLE 1

| Ex. No. | Plated Steel Sheet (amount of plating) | Chromate Treatment | Coating Resin Composition (parts by weight) | | Baking Conditions |
|---|---|---|---|---|---|
| 2 | Zn-12% Ni-plates steel (20 g/m$^2$) | CrO$_3$ (50 mg as Cr) | water-soluble urethane resin | 100 | ultimate temp. 150°C. |
| | | | colloidal silica (SiO$_2$ 40%) | 50 | time 90 sec. |
| | | | gamma-methacryloxy-propyltri-methoxysilane | 3 | average film thickness |
| | | | | | 1.5 μm |
| | | | pure water | 200 | |
| 3 | Zn-12% Ni-plated steel (20 g/m$^2$) | CrO$_3$ (50 mg as Cr) | water-soluble urethane resin | 100 | ultimate temp. 200° C. |
| | | | colloidal silica (SiO$_2$ 40%) | 50 | time 120 sec. |
| | | | gamma-aminopropyltri-methoxysilane | 9 | average film thickness |
| | | | zinc powder | 60 | 3.5 μm |
| | | | pure water | 200 | |
| 4 | Zn-12% Ni-plated steel (20 g/m$^2$) | CrO$_3$ (50 mg as Cr) | water-soluble urethane resin | 100 | ultimate temp. 180° C. |
| | | | colloidal silica (SiO$_2$ 40%) | 50 | time 60 sec. |
| | | | gamma-methacryloxy-propyltrimethoxy-silane | 3 | average film thickness 0.8 μm |
| | | | silcon-containing water repellent (Light Silicone P-290, available from Kyouei Oils and Fats Co., Ltd.) | 10 | |
| | | | isocyanate crosslinking agent (Millionate MS-50, available from Nippon Polyurethane Ind. Co., Ltd.) | 10 | |
| | | | pure water | 200 | |
| 5 | Zn-12% Ni-plated steel (20 g/m$^2$) | CrO$_3$ (50 mg as Cr) | water-soluble urethane resin | 90 | ultimate temp. 200° C. |
| | | | water-soluble acrylic resin | 10 | time 60 sec. |
| | | | colloidal silica (SiO$_2$ 40%) | 60 | average film thickness |
| | | | gamma-aminopropyltri-methoxysilane | 5 | 1.0 μm |
| | | | SE1980 | 10 | |
| | | | Dismodule AP Stable | 10 | |
| | | | pure water | 200 | |
| 6 | Zn-12% Ni-plated steel (20 g/m$^2$) | CrO$_3$ (50 mg as Cr) | water-soluble urethane resin | 100 | ultimate temp. 200° C. |
| | | | colloidal silica (SiO$_2$ 40%) | 50 | time 60 sec. |
| | | | SiO$_2$ powder (average size 2.0 μm) | 12.5 | average film thickness 1.0 μm |
| | | | gamma-mercaptopropyltri-methoxysilane | 10 | |
| | | | Light Silicone | 8 | |
| | | | Millionate MS-50 | 8 | |
| | | | pure water | 500 | |
| 7 | galvannealed steel (58 g/m$^2$) | CrO$_3$ (50 mg as Cr) | water-soluble urethane resin | 100 | ultimate temp. 200° C. |
| | | | colloidal silica (SiO$_2$ 40%) | 60 | time 60 sec. |
| | | | gamma-mercaptopropyltri-methoxysilane | 10 | average film thickness |
| | | | pure water | 500 | 1.0 μm |
| 8 | galvannealed steel (58 g/m$^2$) | CrO$_3$ (50 mg as Cr) | water-soluble urethane emulsion | 100 | ultimate temp. 180° C. |
| | | | colloidal silica (SiO$_2$ 40%) | 60 | time 60 sec. |
| | | | gamma-methacryloxy-propyl methoxysilane | 9 | average film thickness |
| | | | SE1980 | 7 | 1.5 μm |

TABLE 1-continued

| Ex. No. | Plated Steel Sheet (amount of plating) | Chromate Treatment | Coating Resin Composition (parts by weight) | | Baking Conditions |
|---|---|---|---|---|---|
| 9 | galvannealed steel (58 g/m$^2$) | CrO$_3$ (50 mg as Cr) | Millionate MS-50 | 20 | ultimate temp. 180° C. time 60 sec. average film thickness 1.0 μm |
| | | | pure water | 750 | |
| | | | water-soluble urethane emulsion | 100 | |
| | | | colloidal silica (SiO$_2$ 40%) | 50 | |
| | | | Zn powder (average size 1.5 μm) | 60 | |
| | | | gamma-mercaptopropyltrimethoxysilane | 9 | |
| | | | Texguard 130 | 14 | |
| | | | Dismodule AP Stable | 8 | |
| | | | pure water | 300 | |

COMPARATIVE EXAMPLES 1 to 7

The general procedure of Example 1 was repeated except that Zn alloy-plated steel sheets, a chromate layer, resin compositions and baking conditions used were indicated in Table 2 below, thereby obtaining organic resin composition-coated Zn alloy-plated steel sheets for comparison.

TABLE 2

| Comp. Ex. No. | Plated Steel Sheet (amount of plating) | Chromate Treatment | Coating Resin Composition (parts by weight) | | Baking Conditions |
|---|---|---|---|---|---|
| 1 | Zn-12% Ni-plated steel (20 g/m$^2$) | CrO$_3$ (50 mg as Cr) | water-soluble epoxy resin | 100 | ultimate temp. 200° C. time 60 sec. average film thickness 1.0 μm |
| | | | colloidal silica (SiO$_2$ 40%) | 50 | |
| | | | pure water | 400 | |
| 2 | Zn-12% Ni-plated steel (20 g/m$^2$) | CrO$_3$ (50 mg as Cr) | nil | | nil |
| 3 | Zn-12% Ni-plated steel (20 g/m$^2$) | CrO$_3$ (50 mg as Cr) | water-soluble epoxy resin | 100 | ultimate temp. 200° C. time 60 sec. average film thickness 1.0 μm |
| | | | colloidal silica (SiO$_2$ 40%) | 50 | |
| | | | gamma-methacryloxypropyltrimethoxysilane | 2 | |
| | | | pure water | 200 | |
| 4 | Zn-12% Ni-plated steel (20 g/m$^2$) | CrO$_3$ (50 mg as Cr) | water-soluble acrylic resin | 100 | ultimate temp. temp. 200° C. time 60 sec. average film thickness 1.2 μm |
| | | | colloidal silica (SiO$_2$ 40%) | 50 | |
| | | | gamma-mercaptopropyltrimethoxysilane | 10 | |
| | | | pure water | 200 | |
| 5 | Zn-12% Ni-plated steel (20 g/m$^2$) | CrO$_3$ (50 mg as Cr) | water-soluble polyvinyl alcohol | 100 | ultimate temp. temp. 200° C. time 60 sec. average film thickness 1.0 μm |
| | | | colloidal silica (SiO$_2$ 40%) | 50 | |
| | | | gamma-methacryloxypropylmethoxysilane | 3 | |
| | | | pure water | 200 | |
| 6 | Zn-12% Ni-plated steel (20 g/m$^2$) | CrO$_3$ (50 mg as Cr) | water-soluble epoxy resin | 100 | ultimate temp. temp. 250° C. time 60 sec. average film thickness 4.5 μm |
| | | | colloidal silica (SiO$_2$ 40%) | 50 | |
| | | | zinc powder | 40 | |
| | | | gamma-methacryloxypropylmethoxysilane | 3 | |
| | | | pure water | 200 | |
| 7 | galvannealed steel | CrO$_3$ (50 mg as Cr) | nil | | nil |

TABLE 2-continued

| Comp. Ex. No. | Plated Steel Sheet (amount of plating) | Chromate Treatment | Coating Resin Composition (parts by weight) | Baking Conditions |
|---|---|---|---|---|
| | (58 g/m²) | | | |

The steel sheet samples obtained in the above examples and comparative examples were, respectively, subjected to the performance tests set forth before. The results are summarized in Table 3 below.

TABLE 3

| | Paint Finishing Property (DOI) | Paint Adhesion (rate of remaining cross-cut films) | Cratering Property (crater formation voltage, V) | Corrosion Resistance (depth of corrosion mm) | Spot Weldability (number of continuous spotting points) | Film Adhesion Under Forming Condition (amount of separated film, g/m²) |
|---|---|---|---|---|---|---|
| Ex. No. | | | | | | |
| 1 | 22–31 | 100/100 | 280 | 0.020 | 4900 | 0.4 |
| 2 | 25–32 | 100/100 | 280 | 0.015 | 4600 | 0.5 |
| 3 | 24–32 | 100/100 | 280 | 0.012 | 5700 | 0.8 |
| 4 | 48–60 | 100/100 | 280 | 0.020 | 5100 | 0.5 |
| 5 | 46–59 | 100/100 | 280 | 0.021 | 4700 | 0.5 |
| 6 | 50–58 | 100/100 | 260 | 0.011 | 6100 | 0.8 |
| 7 | 21–30 | 100/100 | 260 | 0.020 | 4900 | 1.7 |
| 8 | 41–52 | 100/100 | 260 | 0.010 | 4700 | 1.9 |
| 9 | 40–53 | 100/100 | 260 | 0.012 | 5000 | 2.2 |
| Comp. Ex. No. | | | | | | |
| 1 | 26–38 | 85/100 | 220 | 0.18 | 4100 | 1.4 |
| 2 | 40–51 | 95/100 | 180 | 0.382 | 5900 | 0.5 |
| 3 | 23–30 | 88/100 | 240 | 0.150 | 4200 | 1.8 |
| 4 | 18–27 | 91/100 | 220 | 0.032 | 3200 | 1.0 |
| 5 | 20–29 | 82/100 | 200 | 0.051 | 2100 | 1.6 |
| 6 | 10–15 | 85/100 | 200 | 0.021 | 2900 | 1.2 |
| 7 | 21–32 | 95/100 | 180 | 0.458 | 2800 | 3.5 |

The comparison between Example 1 and Comparative Example 1 where the epoxy resin is used reveals that the corrosion preventive steel sheet of Example 1 is better than that of Comparative Example 1 with respect to not only the corrosion resistance and the film adhesion under forming conditions, but also the cratering resistance, paint adhesion and spot weldability. Since the steel sheet obtained in Comparative Example 2 is free of any organic coating layer, the corrosion and cratering resistances are poorer than in the case of Comparative Example 1.

The comparison between the sheet of Example 2 using the urethane resin and the sheets of Comparative Examples 3 to 5 where the epoxy resin, acrylic resin and polyvinyl alcohol are used, respectively, reveals that the sheet of the invention is better with respect to the corrosion resistance, film adhesion under forming conditions, cratering resistance and paint adhesion.

In Example 3, the zinc powder is added to the organic layer, by which the corrosion resistance is further improved over the sheet of Example 1. Comparative Example 6 is different in type of resin from Example 3 and all the characteristics except for the paint finish are inferior to those of Example 3.

In Examples 4,5, the silicon-containing water repellent and isocyanate crosslinking agent are added to the compositions of Examples 1,2, by which the paint finishing property is significantly improved. When $SiO_2$ powder is further added to the composition of Example 4, the spot weldability is further improved.

In Example 7, the galvannealed steel sheet is used as a plated steel sheet. The comparison with Comparative Example 7 wherein the galvannealed steel sheet is used demonstrates that there is a significant difference in the characteristic properties. The organic coated steel sheet of Example 8 wherein the water repellent and crosslinking agent are added to the composition of Example 7 and the organic coated steel sheet of Example 9 wherein the zinc powder is further added to the composition of Example 8 are, respectively, improved in paint finishing property and spot weldability.

What is claimed is:

1. A corrosion preventive steel sheet which comprises a zinc alloy-plated steel sheet, and a chromate layer and an organic coating layer formed on at least one side of the steel sheet in this order, said organic coating layer being formed from a coating composition comprised of 100 parts by weight of a water-soluble urethane resin and from 5 to 80 parts by weight of colloidal silica.

2. A corrosion preventive steel sheet according to claim 1, wherein said coating composition further comprises from 1 to 40 parts by weight of a silane coupling agent, from 1 to 20 parts by weight of a silicon or fluorine-containing water repellent, and from 1 to 20 parts by weight of a water-soluble isocyanate cross-linking agent.

3. A corrosion preventive steel sheet according to claim 1, wherein said coating composition further comprises from 1 to 20 parts by weight of a silicon or fluorine-containing water repellent and from 1 to 20 parts by weight of a water-soluble isocyanate crosslinking agent.

4. A corrosion preventive steel sheet according to claim 1, wherein said coating composition further comprises from 1 to 40 parts by weight of a silane coupling agent.

5. A corrosion preventive steel sheet according to claim 2, wherein said coating composition further comprises from 50 to 600 parts by weight of zinc powder.

6. A corrosion preventive steel sheet according to any of claims 1-4, wherein said Zn alloy-plated steel sheet is a Zn-Ni alloy-plated steel sheet.

7. A corrosion preventive steel sheet according to any of claims 1-4, wherein said chromate layer is formed in an amount of from 1 to 500 mg/m$^2$.

8. A corrosion preventive steel sheet according to any of claims 1-4, wherein said organic coating layer is formed in an amount of from 0.5 to 5.0 g/m$^2$.

9. A corrosion preventive steel sheet according to any of claims 1-4, wherein said isocyanate crosslinking agent is an aliphatic polyisocyanate having isocyanates groups capable of being released under baking conditions of not lower than 160° C. and not shorter than 3 minutes.

10. A corrosion preventive steel sheet according to any of claims 1-4, wherein said Zn alloy-plated steel sheet is a Zn-Fe alloy-plated steel sheet.

11. A corrosion preventive steel sheet according to claim 10, wherein said Zn-Fe alloy-plated steel sheet is a galvannealed steel sheet obtained by heating an Zn-plated steel sheet.

12. A corrosion preventive steel sheet according to claim 11, wherein the Zn-Fe alloy plating is made of an Zn-Fe alloy having an Fe content of from 6 to 20 wt%.

13. A corrosion preventive steel sheet according to any of claims 1-4, further comprising from 10 to 200 parts by weight of a nonmetallic powder per 100 parts by weight of said water-soluble organic resin.

14. A corrosion preventive steel sheet according to claim 13, wherein said nonmetallic powder is an SiO$_2$ powder.

15. A corrosion preventive steel sheet according to claim 13, wherein said nonmetallic powder has a size of from 0.1 to 5 micrometers.

16. A method for making a corrosion preventive steel sheet which comprises: providing a zinc alloy-plated steel sheet having a chromate layer on at least one side thereof; applying onto the at least one side of steel sheet a coating composition comprised of 100 parts by weight of a water-soluble urethane resin, from 5 to 80 parts by weight of colloidal silica and 1 to 40 parts by weight of a silane coupling agent; and baking the applied composition to form a resin layer on the at least one side.

17. A method according to claim 16, wherein said coating composition further comprises from 1 to 20 parts by weight of a silicon or fluorine-containing water repellent, and from 5 to 20 parts by weight of a water-soluble isocyanate crosslinking agent and the applied composition is baked at an ultimate temperature of from 90° to 200° C. for a time of from 15 to 120 seconds.

18. A method according to claim 16, wherein said coating composition further comprises from 50 to 600 parts by weight of zinc powder.

19. A method according to claim 16, wherein said coating composition said coating composition further comprises from 10 to 200 parts by weight of a nonmetallic powder per 100 parts by weight of said water-soluble resin.

* * * * *